United States Patent [19]

Ruckes et al.

[11] Patent Number: 4,882,361
[45] Date of Patent: Nov. 21, 1989

[54] PROCESS FOR THE PRODUCTION OF POLYURETHANE UREA ELASTOMERS

[75] Inventors: Andreas Ruckes; Gerhard Grögler, both of Leverkusen; Richard Kopp, Cologne, all of Fed. Rep. of Germany

[73] Assignee: Bayer Aktiengesellschaft, Leverkusen, Fed. Rep. of Germany

[21] Appl. No.: 245,846

[22] Filed: Sep. 16, 1988

[30] Foreign Application Priority Data

Sep. 29, 1987 [DE] Fed. Rep. of Germany ....... 3732726

[51] Int. Cl.$^4$ .............................................. C08G 18/14
[52] U.S. Cl. ........................................ 521/51; 264/51; 264/328.1; 264/328.6; 264/328.8; 521/68; 521/76; 521/77; 521/83
[58] Field of Search ................. 521/51, 68, 76, 77, 521/83; 264/51, 328.1, 328.6, 328.8

[56] References Cited

U.S. PATENT DOCUMENTS

| | | | |
|---|---|---|---|
| 3,105,062 | 9/1963 | Graham et al. | 260/75 |
| 4,218,543 | 8/1980 | Weber et al. | 521/51 |
| 4,631,298 | 12/1986 | Presswood | 521/163 |

FOREIGN PATENT DOCUMENTS

| | | |
|---|---|---|
| 1218190 | 2/1987 | Canada . |
| 26915 | 4/1981 | European Pat. Off. . |
| 2635400 | 9/1978 | Fed. Rep. of Germany . |
| 3147736 | 6/1983 | Fed. Rep. of Germany . |

*Primary Examiner*—Maurice J. Welsh
*Attorney, Agent, or Firm*—Gene Harsh; Joseph C. Gil; Thomas W. Roy

[57] ABSTRACT

The present invention is directed to a process for the production of compact or cellular, elastomeric moldings having a compact skin based on polyurethane urea elastomers prepared from (a) organic polyisocyanates,
(b) relatively high molecular weight polyhydroxyl or polyamino compounds containing at least two reactive hydrogen atoms,
(c) diaminodiphenyl ureas as chain-extending agents and optionally,
(d) catalysts,
(e) small quantities of ethylene glycol,
(f) other chain-extending agents and/or cross-linking agents,
(g) blowing agents and
(h) auxiliaries and/or additives, which is characterized in that the chain-extending agents (c) are diaminodiphenyl ureas corresponding to formula I

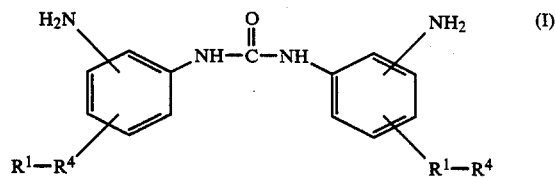

wherein $R^1$, $R^2$, $R^3$ and $R^4$ may be the same or different and represent hydrogen or a $C_1$–$C_6$ alkyl radical and wherein the $NH_2$ groups are in the m- and/or p-position to the urea group.

The present invention is also directed to the RIM elastomers produced by this process.

14 Claims, No Drawings

PROCESS FOR THE PRODUCTION OF POLYURETHANE UREA ELASTOMERS

BACKGROUND OF THE INVENTION

1. Field of the Invention

This invention relates to the production of temperature-resistant, compact or cellular polyurethane urea elastomers by the reaction injection molding technique using high-melting aromatic diaminodiphenyl ureas.

2. Description of the Prior Art

The production of compact or cellular polyurethane elastomers from polyisocyanates and relatively high molecular weight polyhydroxyl or polyamino compounds in the presence of catalysts and, optionally, chain-extending agents, crosslinking agents, blowing agents, and other auxiliaries or additives is known. Provided the starting components are suitably selected, it is possible by this process to produce both elastomeric and rigid products and intermediate variants.

However, systems containing diamines as chain-extending agents could only be used for the production of optionally cellular elastomeric moldings having a compact skin after the development of the high-pressure reaction injection molding technique. Diethyl toluenediamines and similar aromatic diamines, wherein the amino groups are sterically hindered by alkyl substituents in the ortho position, are largely used for this purpose.

Processes for the production of polyurethane elastomers using polyamines as chain-extending agents are described, for example, in DE-A-No. 2,622,951 (U.S. Pat. No. 4,218,543) and in EP-A-Nos. 0,081,701, 26,915 and 69,286.

Despite the stearic hindrance, however, the amino groups are still sufficiently reactive that the cream times of the corresponding systems are of the order of a few seconds. For this reason, considerable difficulties are involved in filling large and/or complicated mold cavities and in obtaining products of relatively high flexural strength by increasing the quantity of amine chain-extending agents. In the latter case, useless products which break on removal from the mold have previously been obtained beyond a certain quantity of diamine.

The moldings obtained by the known processes are used, for example, in the shoe industry as soles or in the automotive industry as body or fascia components.

There is a need for chain-extending agents which may be used for the production of formulations for reaction injection molding (RIM) which have an adequate cream time for filling large molds, have short in-mold times for sufficiently short cycle times, show acceptable properties (green strength, etc.) at the time of removal from the mold and after hardening, show excellent physical and thermal properties such as high flexural strength and heat deflection temperature under load.

The use of mixtures of aromatic diamines having different reactivities are described for this purpose in U.S. Pat. No. 4,631,298, although their gel times are still of the order of a few seconds.

An object of the present invention is to provide systems using aromatic diamines as chain-extending agents which are suitable for the production of optionally cellular elastomers by reaction injection molding, wherein the systems have cream times such that large molds can be readily filled and such that processing may be carried out by the low-pressure process almost exclusively used in the shoe industry. It is a further object of the present invention to obtain adequate cycle times and also products which have good green strength and excellent physical properties after hardening.

According to the invention, this object is surprisingly achieved by using high-melting p- and/or m-diaminodiphenyl ureas as heterogeneous chain-extending agents for the production of the polyurethane urea elastomers.

The use of solid diamines as heterogeneous chain-extending agents is known per se. Thus, U.S. Pat. No. 3,105,062 uses solid diamines in polyurethane systems which are hardened below their melting point in heterogeneous phase. However, this process is exclusively used for the production of cast elastomers by the prepolymer technique; the patent specification expressly points out and provides an example to show that completely useless products are obtained in a one-shot process in which polyol, polyisocyanate and solid diamines are mixed together and then hardened in a single step.

Finally, DE-OS No. 2,635,400 describes heterogeneous systems having long pot lives using solid diamines which are preferably processed by the prepolymer technique. However, the preferred o-diaminodiphenyl urea is too unreactive to isocyanates, such that this compound is totally unsuitable as a chain-extending agent for rapid one-shot systems.

Accordingly, it was completely surprising to find that homogeneous polyurethane urea elastomers combining excellent mechanical properties with adequate green strength can be obtained by the reaction of liquid polyisocyanates with combinations of special p- and m-diaminodiphenyl ureas and relatively high molecular weight polyhydroxyl or polyamino compounds in a heterogeneous one-shot reaction using the reaction injection molding technique.

The homogeneity of the products obtained by this process is particularly surprising because it had been expected that useless elastomers containing gel particles would be formed when reactants in powder form are reacted in a heterogeneous reaction by a one-shot process.

SUMMARY OF THE INVENTION

The present invention is directed to a process for the production of compact or cellular, elastomeric moldings having a compact skin based on polyurethane urea elastomers prepared from (a) organic polyisocyanates, (b) relatively high molecular weight polyhydroxyl or polyamino compounds containing at least two reactive hydrogen atoms, (c) diaminodiphenyl ureas as chain-extending agents and optionally, (d) catalysts, (e) small quantities of ethylene glycol, (f) other chain-extending agents and/or crosslinking agents, (g) blowing agents and (h) auxiliaries and/or additives, which is characterized in that the chain-extending agents (c) are diaminodiphenyl ureas corresponding to formula I

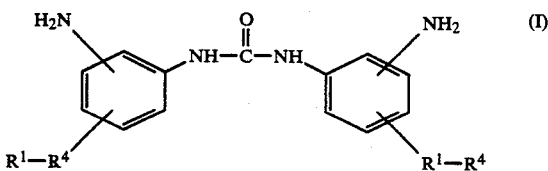

wherein $R^1$, $R^2$, $R^3$ and $R^4$ may be the same or different and represent hydrogen or a $C_1$-$C_6$ alkyl radical and wherein the $NH_2$ groups are in the m- and/or p-position to the urea group.

The present invention is also directed to the RIM elastomers produced by this process.

DETAILED DESCRIPTION OF THE INVENTION

Components (a) to (c) and, optionally, (d) to (h) may be processed as a one-shot system by the RIM technique in other high-pressure machines or low-pressure machines.

The following observations apply to the starting components (a) to (c) and, optionally, (d) to (h) suitable for use in the process according to the invention:

(a) Suitable organic polyisocyanates (a) are those described, for example, in DE-PS No. 2,622,951, pages 11-13 (U.S. Pat. No. 4,218,543, herein incorporated by reference in its entirety). Diisocyanates and polyisocyanates based on 4,4'-diisocyanatodiphenylmethane which are liquid at room temperature are particularly suitable for the process according to the invention. Pure 4,4'-diisocyanatodiphenylmethane (Mp. ~40° C.) may also be used in accordance with the invention.

(b) Polyhydroxypolyalkylene ethers having a molecular weight of about 600 to 12,000, preferably about 1,800 to 7,000, are preferably used as component (b) in the process according to the invention. The polyethers containing at least two, preferably two to three hydroxyl groups suitable for use in accordance with the invention, are known and described, for example, in DE-PS No. 2,622,951, pages 13-14.

However, it is also possible to use other polyhydroxyl compounds of the type described on pages 14-17 of DE-PS No. 2,622,951, including for example polyesters, polythioethers, polyacetals, polycarbonates or polyester amides containing hydroxyl groups which are known for the production of homogeneous and cellular polyurethanes.

In the relatively high molecular weight compounds suitable for use in accordance with the invention, the terminal isocyanate-reactive groups may also be based partly or exclusively on primary and/or secondary, aromatically or aliphatically bound amino groups with the remainder being based on primary and/or secondary, aliphatically bound hydroxyl groups. In these compounds, the terminal radicals bearing the amino groups may also be attached to the relatively high molecular weight compounds by urethane or ester groups. The preparation of this amino compound may be carried out as described, for example, in EP-AS-No. 0,204,246, pages 10 and 11, with reference by way of example to diaminopolyethers.

Preferred aminopolyethers are those obtained in accordance with DE-OS No. 2,948,419 (U.S. Ser. No. 443,414, filed Nov. 22, 1982, herein incorporated by reference in its entirety) by hydrolysis of isocyanate-terminated compounds. In this process, polyethers preferably containing two or three hydroxyl groups are reacted with polyisocyanates to form NCO prepolymers and, in a second step, the isocyanate group is converted into an amino group by hydrolysis.

Mixtures of the compounds containing isocyanate-reactive groups mentioned by way of example may of course also be used in accordance with the invention as starting component (b).

(c) The essential feature of the present invention is the use of m- and/or p-diaminodiphenyl ureas corresponding to formula I as heterogeneous chain-extending agents for the production of the compact or cellular polyurethane urea elastomers.

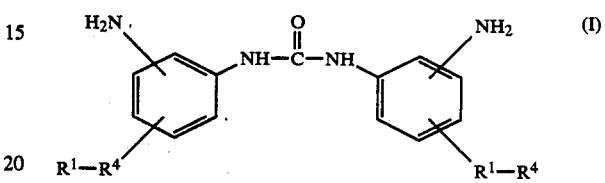

The $NH_2$ groups are in the m- or p-position to the urea group. $R^1$, $R^2$, $R^3$ and $R^4$ may be the same or different and represent either hydrogen or linear and/or branched $C_1$-$C_6$ alkyl radicals.

The diaminodiphenyl ureas (c) suitable for the purposes of the invention are prepared by known methods. For example, nitro anilines may be converted into the corresponding dinitrodiphenyl ureas by reaction with phosgene or diphenyl carbonate and then into the desired diaminodiphenyl ureas by reduction. Another general method comprises reacting aminoacetanilides with phosgene or diphenyl carbonate with subsequent alkaline hydrolysis of the acetamide group to the desired product.

One method which is particularly simple and therefore preferably used for the production of the ureas according to the invention comprises reacting aromatic p- or m-diamines with urea as described in U.S. Pat. No. 1,617,847 (in an inert solvent or in the melt) or U.S. Pat. No. 2,503,797 (in sulfuric acid or neutral aqueous solution).

Due to the production method, however, relatively high molecular weight, polynuclear products corresponding to formula II

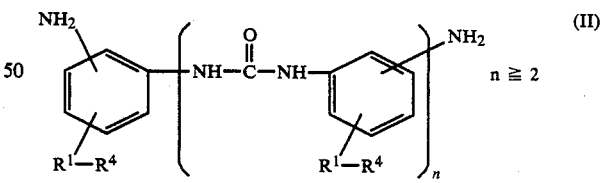

are also formed in addition to the monomeric diaminodiphenyl ureas I, although within certain limits they do not adversely affect the properties of the elastomers. However, the proportion of ureas in which n=1 to 3 should be at least about 60% by weight, based on the total quantity of (c), the proportion of monomer in which n=1 being ≧10% by weight. However, it is preferred to use monomers containing as high a proportion of "monomers" I (n=1) as possible. Component (c) is generally used in a quantity of about 1 to 70% by weight based on the weight of component (b).

The diaminodiphenyl ureas which accumulate in solid form are generally first finely ground, for example in a ball mill, until they have an average particle size of about 1 to 50 μm, preferably about 3 to 10 μm. The powders obtained are then suspended in the polyhydroxyl compound used. However, it is of course also possible to direcfly prepare the suspension by grinding the aromatic diamine into component (b) using known methods. The dispersions thus obtained are then reacted with a polyisocyanate.

Examples of preferred diamines for the production of the ureas according to the invention include p-phenylenediamine, m-phenylenediamine, 2,5-diaminotoluene, 2,4-diaminotoluene, 2,6-diaminotoluene, 1-methyl-3,5-diethyl-2,6-diaminobenzene and 1,3,5-triethyl-2,4-diaminobenzene. The diaminodiphenyl urea prepared from 2,4-diaminotoluene is particularly preferred.

(d) Suitable catalysts (d) which are necessary to obtain moldings characterized by short in-mold times, high green strength and technically interesting mechanical properties, include those described in DE-A-No. 2,626,951, pages 19 to 21, for example, organometallic compounds such as tin(II) octoate or amines such as 1,4-diazabicyclo[2,2,2]octane.

The catalysts mentioned in DE-A-No. 2,622,951 are generally used individually or in combination with one another in a quantity of about 0.001 to 10% by weight, preferably about 0.05 to 1% by weight, based on the quantity of component (b).

The catalysts (d) according to the invention are intended to increase the reactivity of the polyhydroxyl compounds (b) to such an extent that, after the starting components have been mixed, the reacting mixture has a flow time (the time for which the mixture remains transportable) under the processing conditions of about 10 to 60 seconds.

(e) In addition to the diaminodiphenyl ureas (c) used in accordance with the invention, other polyamines and/or polyols may be used as chain-extending agents and/or crosslinking agents for modifying the properties of the moldings. These other polyamines include aromatic diamines which contain an alkyl substituent in an ortho position to the amino groups, of the type described on pages 13 to 14 of EP-AS No. 0,204,246. Examples of such amines include 1-methyl-3,5-diethyl-2,4-diaminobenzene or 2,4-diaminomesitylene. Suitable polyols include compounds containing at least two hydroxyl groups and having a molecular weight of 32 to 599.

Examples of compounds such as these are 1,2- and 1,3-propylene glycol, 1,4- and 2,3-butylene glycol, pentane-1,5-diol, hexane-1,6-diol, octane-1,8-diol, neopentyl glycol, 1,4-bishydroxymethyl cyclohexane, 2-methyl propane-1,3-diol, glycerol, trimethylolpropane, hexane-1,2,6-triol, trimethylolethane, pentaerythritol, quinitol, mannitol and sorbitol, diethylene glycol, triethylene glycol, tetraethylene glycol, polyethylene glycols having a molecular weight of up to 599, dipropylene glycol, polypropylene glycols having a molecular weight of up to 599, dibutylene glycol, polybutylene glycols having a molecular weight of up to 599, 4,4'-dihydroxydiphenyl propane, dihydroxymethyl hydroquinone, ethanolamine, diethanolamine and triethanolamine.

Blowing agents of the type described, for example, in DE-A-No. 2,622,951, pages 21–22, may be used for the production of moldings having a compact skin and a cellular core. For example, water and/or monofluorodichloromethane may be used as blowing agents (f).

According to the invention, it is also possible to use other auxiliaries and/or additives (g), including surface-additives such as emulsifiers and foam stabilizers, cell regulators, stabilizers against the effects of aging and weather, plasticizers and fungistatic and bacteriostatic substances and also flameproofing agents, plasticizers, dyes and fillers. Compounds such as these are described, for example, in DE-A-No. 2,622,951, pages 22–23, and in Kunststoff-Handbuch, Vol. IV, published by Vieweg and Hochtlen, Carl-Hanser-Verlag, Munich 1966, for example on pages 103 to 113.

The polyurethane urea elastomers are produced by the known reaction injection molding technique using either the high-pressure process or the low-pressure process. The reactivity of the particular diaminodiphenyl ureas (c) with the polyisocyanates is of secondary importance as far as the reaction velocity of the overall mixture is concerned. Rather, the cross-linking velocity is determined for the most part by the solubility of the urea in the reaction mixture. The solubility of the ureas (c) according to the invention may be increased to a certain extent by using polyhydroxyl compounds (b) having a high ethylene oxide content or by addition of small quantities of ethylene glycol as a solution promoter. It is thus possible to adapt the reaction velocity of the system as a whole and hence the cream time and in-mold time within certain limits to meet particular requirements. For example, the addition of ethylene glycol leads to an increase in the reaction velocity and hence to shorter cream times and in-mold times, i.e. to shorter cycle times.

The quantity of optionally foamable mixture introduced into the mold is gauged such that the molding has a density of about 0.3 to 1.4 g/cm$^3$, preferably about 0.9 to 1.1 g/cm$^3$.

A temperature of about 10° to 70° C., preferably about 20° to 40° C., is selected as the starting temperature of the mixture introduced into the mold. The mold temperature is between about 40° and 120° C., preferably between about 50° and 95° C.

It may be of advantage in some cases to use standard mold release agents, for example based on wax or silicone, to improve mold release.

In the process according to the invention, the quantity of polyisocyanate is preferably gauged in such a way that an isocyanate index of about 70 to 130, preferably about 90 to 110, is present in the reactive mixture.

The compact polyurethane urea elastomers obtainable by the process according to the invention are suitable for use in the automotive industry, for example as fenders and components such as mudguards, spoilers and wheel arch enlargements, housing components and rollers, while the cellular polyurethane elastomers may be used as arm rests, head rests, safety coverings in vehicle interiors and motorcycle and bicycle saddles, seat cushions, cover layers in composite foams and, with densities of about 0.30 to 0.70 g/cm$^3$, above all as shoe soles.

The process according to the invention is illustrated by the following examples in which all parts are parts by weight unless otherwise specified.

EXAMPLES

Example 1

Component A: a mixture of 50.2 parts by weight diaminodiphenyl urea based on 2,4-toluylenediamine having an amine number of 330 mg KOH/g and containing a proportion of ureas in which n=1 to 3 of 83% by weight, the proportion of monomeric urea in which n=1 being 57% by weight, 100 parts by weight of a polyether having a hydroxyl number of 26 obtained by addition of 78% by weight propylene oxide and subsequent addition of 22% by weight ethylene oxide onto trimethylolpropane, 0.3 parts by weight dimethyl tin dilaurate, 0.15 part by weight 1,4-diaza-(2,2,2)-bicyclooctane.

Component B:

Reaction product of tripropylene glycol and 4,4'-diphenylmethane diisocyanate (23% NCO).

100 parts by weight of component A and 41 parts by weight of component B, corresponding to an isocyanate index of 100, were intensively mixed for 10 seconds using a high-speed stirrer.

484.5 g of this reaction mixture were then introduced into a metal mold kept at 90° C. and left to harden for 10' in the closed mold. After removal of the plate from the mold, the plate was kept at 110° C. for 2 hours. The following mechanical properties were found:

Density: 1.1 g/cm$^2$
Density of the test plate: 4 mm±0.2 mm
Tensile strength (DIN 53 504): 15.83 MPa
Tear propagation resistance (DIN 53 515): 62.2 KN/m
Elongation at break (DIN 53 504): 100%
Elasticity (DIN 53 512): 36%
Shore D (DIN 53 505): 65

Example 2

Component A: a mixture of 49.2 parts by weight diaminodiphenyl urea based on 2,4-toluylenediamine having an amine value of 290 mg KOH/g and containing a proportion of ureas in which n=1 to 3 of 70.5% by weight, the proportion of monomeric urea in which n=1 being 39% by weight, 100 parts by weight of a polyether having a hydroxyl number of 28 obtained by addition of 83% by weight propylene oxide and subsequent addition of 17% by weight ethylene oxide onto trimethylolpropane, 0.01 part by weight dimethyl tin dilaurate,
0.1 part by weight 1,4-diaza-(2,2,2)-bicyclooctane:

Component B as in Example 1

100 parts by weight of component A and 36.8 parts by weight of component B, corresponding to an isocyanate index of 100, were processed in the same way as in Example 1.

Mixing time: 10 seconds
Mold temperature: 80° C.
In-mold time: 10 minutes
Conditioned for 2 hours at 150° C.
Thickness of the test plate: 4 mm±0.2 mm
Density: 1.08 g/cm$^3$
Tensile strength (DIN 53 504): 21.74 MPa
Tear propagation resistance (DIN 53 515): 54.2 KN/m
Elongation at break (DIN 53 504): 250%
Elasticity (DIN 53 512): 43%
Shore D (DIN 53 505): 66

Example 3

Component A: a mixture of
5.4 parts by weight of the diaminodiphenyl urea of Example 2,
100 parts by weight of the polyether of Example 2,
0.44 part by weight dimethyl tin dilaurate.

Component B as in Example 1.

100 parts by weight of component A and 54.8 parts by weight of component B, corresponding to an isocyanate index of 100, were processed in the same way as in Example 1.

Mixing time: 13 seconds
Mold temperature: 65° C.
In-mold time: 2 minutes
Conditioned for 45 minutes at 120° C.
Thickness of the test plate: 4 mm±0.2 mm
Density: 1.08 g/cm$^3$
Tensile strength (DIN 53 504): 2.81 MPa
Tear propagation resistance (DIN 53 515): 7.3 KN/m
Elongation at break (DIN 53 504): 250%
Elasticity (DIN 53 512): 51%
Shore A (DIN 53 505): 56

Example 4

Component A: a mixture of
3 parts by weight of the diaminodiphenyl urea of Example 2,
100 parts by weight of a polyester obtained by the condensation of adipic acid and a mixture of ethylene glycol, butane-1,4-diol and hexane-1,6-diol, obtained by reaction of adipic acid and ethylene glycol/butane diol in the molar ratio of 6:4, subsequently further reaction of this product with adipic acid and butane diol/hexane diol in the molar ratio of 6:4, hydroxyl number 60.7,
0.4 part by weight dimethyl tin dilaurate.

Component B:

Reaction product of a polyester based on adipic acid, ethylene glycol and butane-1,4-diol (in a molar ratio of 1:0,74:0,36), hydroxyl number 52-58, and a mixture of 4,4'-diphenylmethane diisocyanate and carbodiimide-modified 4,4'-diphenylmethane diisocyanate (19% NCO).

100 parts by weight of component A and 26.1 parts by weight of component B, corresponding to an isocyanate index of 100, were processed in the same way as in Example 1.

Mixing time: 10 seconds
mold temperature: 85° C.
In-mold time: 5 minutes
Conditioned for 45 minutes at 120° C. Thickness of test plate: 4 mm±0.2 mm
Density: 1.08 g/cm$^3$
Tensile strength (DIN 53 504): 9.13 MPa
Tear propagation resistance (DIN 53 515): 17.2 KN/m
Elongation at break (DIN 53 504): 850%
Elasticity (DIN 53 512): 57%
Shore A (DIN 53 505): 58

Example 5

A rigid polyurethane integral foam formulation with and without a diaminodiphenyl urea is presented by way of comparison in this example.

| | Formulation | Parts by weight |
|---|---|---|
| Component A: mixture of | I | II |
| A diaminodiphenyl urea based on 2,4-toluylenediamine having an amine value of 327/mg KOH/g, a proportion of ureas in which n = 1 to 3 of 85.5% by weight, the proportion of monomer in which n = 1 being 58% by weight | — | 10 |
| A polyether having a hydroxyl number of 42 prepared by propoxylation of a mixture of trimethylolpropane and propylene glycol (molar ratio 3:1) and subsequent ethoxylation (molar ratio of propylene oxide to | 60 | 60 |

|  | Formulation | Parts by weight |
|---|---|---|
| ethylene oxide = 3:7), | | |
| A polyether having a hydroxyl number of 860 prepared by the propoxylation of trimethylolpropane, | 40 | 40 |
| OS 50, a polysiloxane-polyalkylene oxide block polymer made by Goldschmidt, Essen | 1 | 1 |
| dimethylbenzylamine, | 3 | 3 |
| Tetramethyl guanidine, | 0.5 | 0.5 |
| H₃PO₄ (85%), | 0.2 | 0.2 |
| Trichlorofluoromethane | 10 | 10 |
| Component B: | | |
| A polyisocyanate obtained by the phosgenation of an aniline/formaldehyde condensate and having a viscosity of 130 mPa.s at 25° C. and an NCO content of 31% by weight | 133 | 141.7 |

The components were intensively mixed for 12 seconds using a high-speed stirrer and the resulting mixtures were subsequently introduced into a 310×245×10 mm mold kept at 60° C. After 10 minutes, hardened plates having gross densities of 587 g/cm³ were removed from the mold. The mechanical properties were as follows:

|  | Formulation | |
|---|---|---|
|  | I | II |
| Deflection temperature under load with flexural stressing* | 95° C. | 105° C. |
| E modulus (53512) | 1130 MPa | 1106 MPa |
| Elongation at break (53504) | 4.5% | 3.6% |
| Tensile strength (53504) | 38 MPa | 33.6 MPa |

*Supporting beam arrangement, bending strain 0.294 MPa, heating rate 50° C./h, temperature at 10 mm deflection.

This example shows that processing is virtually unaffected by the addition of the diaminodiphenyl urea and that the diamine also reacts in the rapid hardening reaction, as reflected in the improved heat deflection temperature under load.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a compact or cellular, elastomeric molding having a compact skin which comprises reacting as a one-shot system by the high-pressure or low-pressure reaction injection molding process
   (a) an organic polyisocyanate,
   (b) a polyhydroxyl or polyamine compound having a molecular weight of 600 to about 12,000 and containing at least two isocyanate-reactive hydrogen atoms and
   (c) a chain-extending agent which comprises a diaminodiphenyl urea corresponding to the formula

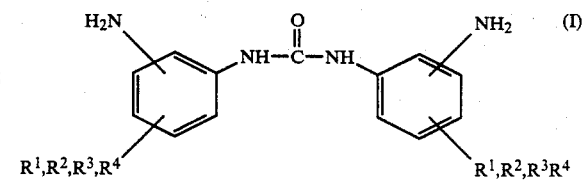

wherein
   $R^1$, $R^2$, $R^3$, and $R^4$ may be the same or different and represent hydrogen or a $C_1$–$C_6$-alkyl radical and wherein the amino groups are in the m- and/or p-position to the urea group.

2. The process of claim 1 wherein said diaminodiphenyl urea is present in said one-shot system in the form of a powder having an average particle size of about 1 to 50 μm.

3. The process of claim 1 wherein said diaminodiphenyl urea additionally comprises a compound corresponding to the formula

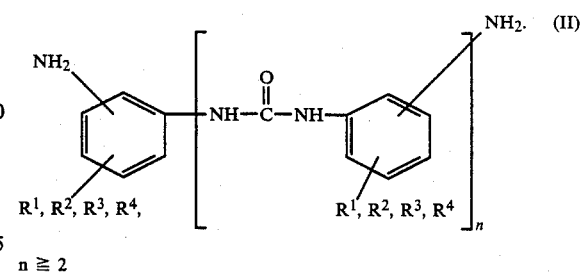

$n \geq 2$

4. The process of claim 3 wherein the proportion of diaminodiphenyl urea in which n=1 to 3 is at least 60% by weight, based on the total quantity of component (c), and wherein the proportion in which n=1 is at least 10% by weight.

5. The process of claim 1 wherein said diaminodiphenyl urea is based on 2,4-diaminotoluene.

6. The process of claim 1 wherein component (c) comprises about 1 to 5% by weight of ethylene glycol.

7. The process of claim 1 wherein said diaminodiphenyl urea is used in a quantity of about 1 to 70% by weight, based on component (b), and the quantity of organic polyisocyanate (a) is selected to provide an isocyanate index of about 70 to 130.

8. A compact or cellular, elastomeric molding having a compact skin which is prepared by a process which comprises reacting as a one-shot system by the high-pressure or low-pressure reaction injection molding process
   (a) an organic polyisocyanate,
   (b) a polyhydroxyl or polyamine compound having a molecular weight of 600 to about 12,000 and containing at least two isocyanate-reactive hydrogen atoms and
   (c) a chain-extending agent which comprises a diaminodiphenyl urea corresponding to the formula

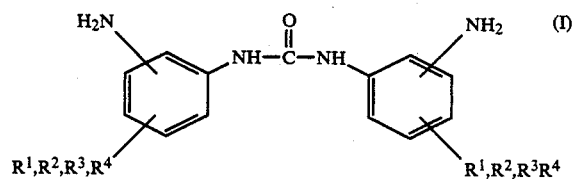

(I)

wherein $R^1$, $R^2$, $R^3$, and $R^4$ may be the same or different and represent hydrogen or a $C_1$-$C_6$-alkyl radical and wherein the amino groups are in the m- and/or p-position to the urea group.

9. The molding of claim 8 wherein said diaminodiphenyl urea is present in said one-shot system in the form of a powder having an average particle size of about 1 to 50 μm.

10. The molding of claim 8 wherein said diaminodiphenyl urea additionally comprises a compound corresponding to the formula

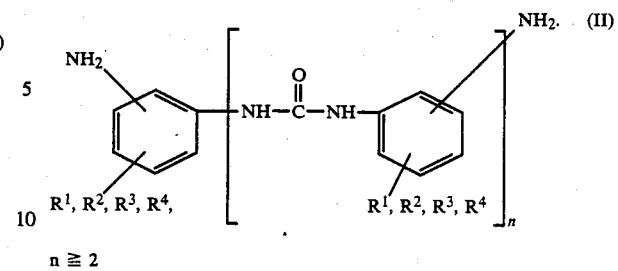

(II)

$n \geq 2$

11. The molding of claim 10 wherein the proportion of diaminodiphenyl urea in which n=1 to 3 is at least 60% by weight, based on the total quantity of component (c), and wherein the proportion in which n=1 is at least 10% by weight.

12. The molding of claim 8 wherein said diaminodiphenyl urea is based on 2,4-diaminotoluene.

13. The molding of claim 8 wherein component (c) comprises about 1 to 5% by weight of ethylene glycol.

14. The molding of claim 8 wherein said diaminodiphenyl urea is used in a quantity of about 1 to 70% by weight, based on component (b), and the quantity of organic polyisocyanate (a) is selected to provide an isocyanate index of about 70 to 130.

* * * * *